(12) United States Patent
Yamamoto et al.

(10) Patent No.: US 6,366,333 B1
(45) Date of Patent: Apr. 2, 2002

(54) METHOD OF FORMING A CONDUCTIVE AND REFLECTIVE THIN METAL FILM SUITABLE FOR A REFLECTIVE LCD DEVICE AND A DEVICE PRODUCED BY THE METHOD

(75) Inventors: Akira Yamamoto, Ibaragi; Masashi Ohata, Neyagawa; Mamoru Seio, Takatsuki, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/500,354

(22) Filed: Feb. 7, 2000

(30) Foreign Application Priority Data

Feb. 25, 1999  (JP) ............................................. 11-047911

(51) Int. Cl.⁷ ........................... G02F 1/1335; C09D 5/00
(52) U.S. Cl. ...................... 349/113; 106/1.05; 349/112; 349/106
(58) Field of Search ................................ 349/113, 112, 349/106; 106/1.05, 1.28; 430/203, 434

(56) References Cited

U.S. PATENT DOCUMENTS

| | | | | | |
|---|---|---|---|---|---|
| 3,730,716 A | * | 5/1973 | Edwin et al. | ................ | 96/29 R |
| 4,259,116 A | * | 3/1981 | Scott | ........................... | 106/128 |
| 5,700,622 A | * | 12/1997 | Hirai et al. | ................... | 430/203 |
| 5,789,082 A | * | 8/1998 | Treadway | ................... | 428/412 |
| 5,845,606 A | * | 12/1998 | Wessling | .................... | 427/340 |
| 5,998,109 A | * | 12/1999 | Hirbayashi | .................. | 430/434 |

FOREIGN PATENT DOCUMENTS

JP        03-253575 A   * 11/1991

* cited by examiner

Primary Examiner—William L. Sikes
Assistant Examiner—Tarifur R. Chowdhury
(74) Attorney, Agent, or Firm—Olson & Hierl, Ltd.

(57) ABSTRACT

A method is disclosed which can form a thin metal film in a cost-effective manner and by a simple process of applying a coating composition. The method involves applying a coating composition containing colloidal particles of noble metal or copper, as obtained by reducing a compound of the noble metal or copper in the presence of a polymeric dispersant, to form a coating film, and heating the coating film so that the colloidal particles present therein are fused together to form a thin metal film.

15 Claims, 2 Drawing Sheets

METHOD OF FORMING A CONDUCTIVE AND REFLECTIVE THIN METAL FILM SUITABLE FOR A REFLECTIVE LCD DEVICE AND A DEVICE PRODUCED BY THE METHOD

BACKGROUND OF THE INVENTION

1. Field of the Invention

The present invention relates to a method of forming a thin metal film and also to a method for fabrication of a reflector for liquid crystal display ("LCD") devices utilizing the film-forming method.

2. Description of Related Art

In manufacturing processes of semiconductors and LCD devices, conductive electrodes, wiring and the like are occasionally provided in the form of a thin metal film. Such a thin metal film is generally deposited by thin film-forming processes, including vacuum evaporation, sputtering and CVD (chemical vapor deposition). Since these thin film-forming processes are generally performed under a reduced pressure, a substrate and the like must be placed interior of a reactor such as a vacuum chamber. The larger the size of an object onto which a thin metal film is deposited, the larger volume of vacuum chamber is required in order to accommodate the large-size object. This has constrained applicable size of the object.

Also, the difficulty has been encountered when the object has a complex surface profile, such as a curved surface. Other problems have arisen when the object has at its surface recesses or cavities such as contact or bier holes. Since the above-described film-forming processes characteristically produce a metal film having a uniform thickness, the film thickness must be made larger enough to fill up those recesses. Also, the shapes and configurations of the recesses are reflected on a surface of the deposited metal film, resulting in formation of craters thereon.

In Japanese Patent Laying-Open No. Hei 3-281783, a method is disclosed which applies a paste containing ultrafine metal particles for subsequent calcining into a thin metal film. Since the application of the paste results in the formation of thin metal films, this method is suitable for use in the formation of a thin metal film on very large surface areas or on a substrate having a complex surface profile.

Also, the use of such a paste containing a dispersion of ultrafine metal particles results in provision of a thin metal film having a metallic luster as if by plating, and the application of the paste containing a dispersion of ultrafine metal particles is a possible substitute of metal plating. With the use of this method, the metallic luster as if provided by plating can thus be readily imparted to articles having very large surface areas, as well as to nonconductive articles such as plastics.

However, the ultrafine metal particles used in the above-identified reference are prepared by vaporizing a metal at a vacuum atmosphere. This adds to a manufacturing cost to thereby make them expensive. The high cost of the ultrafine metal particles thus limits their practical uses.

SUMMARY OF THE INVENTION

An object of the present invention is to provide a method by which a thin metal film is formed in a cost-effective way and by a simple process that involves applying a coating composition.

Another object of the present invention is to provide a method by which a reflector for reflective LCD devices can be fabricated in a simple way and by a simple process involving application of a coating composition.

A method of forming a thin metal film, according to the present invention, includes the steps of applying a coating composition containing colloidal particles of noble metal or copper, to form a coating film, and heating the coating film so that the colloidal particles in the coating film are allowed to fuse together to form a thin metal film.

In the present invention, the aforementioned colloidal particles of noble metal or copper can be prepared by reducing a compound of the noble metal or copper in the presence of a polymeric dispersant. A specific example is as follows: A noble metal or copper compound is dissolved in a medium to which a polymeric dispersant is added. The subsequent reduction of the compound to noble metal or copper leads to the production of colloidal particles of noble metal or copper surrounded or protected by the polymeric dispersant. Removal of the aforementioned medium results in obtaining a solid sol of noble metal or copper. The aforementioned coating composition can be formulated by adding a medium, and a binder resin, if necessary, to the solid sol. The colloidal particles of noble metal or copper, as prepared in the manner as stated above, have ultrafine particle sizes from about several nanometers to about several tens nanometers. In the present invention, the coating composition containing such colloidal particles of noble metal or copper is applied in the form of a film which is subsequently heated so that the colloidal particles in the coating film are allowed to fuse together to form a thin metal film. The solid sol of noble metal or copper, as well as a colloidal solution prepared by adding a solvent to the solid sol, will be later discussed in more detail.

In the present invention, a thin metal film is formed by applying a coating composition to form a coating film and then heating the coating film. The coating composition is prepared by adding a solvent, alone or in combination with a binder resin, to the aforementioned solid sol of noble metal or copper. In the present invention, the solvent is dry removed prior to application of the coating composition, preferably prior to heating of the coating film. A drying temperature is suitably adjusted depending upon the type and amount of the solvent used. After the drying, the coating film is heated to allow the colloidal particles present therein to fuse together to form a thin metal film. A heating temperature is not particularly specified, so long as it is sufficient to allow the formation of a thin metal film. It is generally preferred, however, that heating is effected in the 100–500° C. temperature range. If the heating temperature is excessively low, the colloidal particles may be prevented from fusing together to result in the failure to form a thin metal film. On the other hand, if the heating temperature is excessively high, the polymeric dispersant present in the coating film, when heated, may escape therefrom by evaporation to leave holes in the resulting thin metal film. For uses where the formation of such holes is permitted, heating may be effected at a further elevated temperature.

In accordance with the present invention, a thin metal film can be formed having a good electrical conductivity. Such conductive, thin metal films can be utilized to constitute conductive circuit elements, such as electrodes and wiring, on semiconductor substrates, printing substrates, or for thermal heads, electronic parts and the like. They can also be utilized to constitute electrodes, electric wiring and the like for display devices such as LCD devices.

Also in accordance with the present invention, a thin metal film can be formed having a metallic luster as if by plating. Such thin metal films can be utilized to impart the metallic luster to article surfaces for decorative or ornamental purposes.

Also, in accordance with the present invention, a thin metal film can be formed having a good electromagnetic wave shielding property. Accordingly, such thin metal films can be utilized as electromagnetic wave shielding films.

A thickness of the thin metal film, as formed according to the present method, is not particularly limited. In accordance with the present invention, a thin metal film can be formed to a thickness within the range of 0.01 $\mu$m–200 $\mu$m, for example. The use of colloidal particles having fine particle sizes permits the formation of an about 0.1 $\mu$m thick metal film.

In accordance with the present invention, a thin metal film can be formed having a good light reflectance. Such a highly reflective, thin metal film can be utilized to constitute a reflecting layer of a reflector for use in reflective LCD devices.

A method for fabrication of a reflector for reflective LCD devices, according to the present invention, utilizes the above-described film-forming method in fabricating the reflector. This fabricating method thus includes the steps of applying a coating composition containing colloidal particles of noble metal or copper prepared by reducing a compound of the noble metal or copper in the presence of a polymeric dispersant, to form a coating film, and heating the coating film to allow the colloidal particles in the coating film to fuse together to thereby form a reflecting layer in the form of a thin metal film.

In the present fabricating method, the reflecting layer may be provided in the form of a thin metal film containing ligh-scattering fine particles. The incorporation of such light-scattering fine particles in the thin metal film increases the ability of the reflecting layer to reflectively scatter the light incident thereupon. This results in a wider angle of view. Such a thin metal film can be formed by incorporating the light-scattering fine particles in the coating composition.

The light-scattering fine particles may be inorganic or organic. Specific examples of inorganic fine particles include those formed of aluminum oxide, titanium oxide, iron oxide, zinc oxide, cerium oxide, yttrium oxide, silicon oxide, manganese oxide, lead oxide, zirconium oxide, magnesium oxide, holmium oxide, indium oxide, copper oxide, barium sulfate, magnesium fluoride, calcium fluoride, lithium fluoride, sodium fluoride, barium fluoride and the like.

Useful organic fine particles may be those obtained by emulsion polymerization, soap-free emulsion polymerization using no emulsifier and dispersion polymerization using a polar organic solvent as a medium. Specific examples of organic fine particles include spherical fine particles of resins, such as crosslinked polymethyl methacrylate, benzoguanamine-formaldehyde condensed thermosetting resin, benzoguanamine-melamine-formaldehyde condensed thermosetting resin, melamine-formaldehyde condensed resin; and fine particles of fluorine-containing polymers, such as polytetrafluoroethylene, perfluoroalkoxy resin, tetrafluoroethylene-hexafluoropropylene copolymer, polyfluorovinylidene, ethylene-tetrafluoroethylene copolymer, polyfluorovinyl resin.

The particularly preferred organic fine particles are crosslinked resin particles obtainable, for exmaple, by mixing an emulsifiable resin, such as an alkyd or polyester resin, synthesized using a monomer having a zwitter ion group in a molecule as one of polyol components, with an ethylenically unsaturated monomer in an aqueous meium, and subjecting the mixture to emulsion polymerization with the aid of an intiator.

The aforementioned monomer having a zwitter ion group in a molecule may be represented, for example, by —N$^+$—R—COO$^-$ or —N$^+$—R—SO$_3^-$, and preferbly contains two or more hydroxyl groups. Hydroxyl-containing aminosulfonic acid type amphoteric compounds are preferred from a synthetic point of view. A specific example is bis (hydroxyethyl)taurine.

Preferred for use as the emulsifiable resin synthesized from the aforementioned monomer having a zwitter ion group in a molecule is a polyester resin having an acid value in the range of 30–150 mgKOH/g, preferably in the range of 40–150 mgKOH/g, and a number-average molecular weight in the range of 500–5,000, preferably in the range of 700–3,000. If the acid value and number-average molecular weight become excessively high, a handling property of the resin may be lowered. On the other hand, if the acid value and number-average molecular weight become excessively low, the emulsifiable resin may have a higher tendency to fall from a resulting coating film. The reduced solvent resistance of the film may also result.

The aforementioned ethylenically unsaturated monomer preferably contains a monomer component having two or more free-radically polymerizable, ethylenically unsaturated groups in a molecule. Such a monomer component is present in the amount of 0.1–90%, preferably of 10–70% of the total weight of the ethylenically unsaturated monomer. Because of inclusion of such a monomeric unit, the resulting crosslinked resin particles can be imparted thereto a crosslinking level sufficient to become insoluble in an organic solvent.

Examples of the monomer components having two or more free-radically polymerizable ethylenically unsaturated groups in a molecule include polymerizable unsaturated monocarboxylic acid esters of polyhydric alcohol, polymerizable unsaturated alcohol esters of polybasic acid, and aromatic compounds having two or more substituted vinyl groups.

Besides the aforementioned crosslinking monomers, $\alpha$, $\beta$-ethylenically unsaturated monomers may be used, examples of which include carboxyl-containing monomers such as acrylic or methacrylic acid; hydroxyl-containing monomers such as 2-hydroxyehtyl acrylate; nitrogen-containing alkyl acrylates or methacrylates such as dimethyl aminoethyl acrylate; polymerizable amides such as acrylamide; polymerizable nitrites such as acrylonitrile; alkyl acrylates or methacrylates; polymerizable aromatic compounds such as styrene; $\alpha$-olefins such as ethylene and propylene; vinyl compounds such as vinyl acetate; and diene compounds such as butadiene.

The aforementioned crosslinked resin particles, because of their suitable crosslinking level, exhibit appropriate levels of hardness and heat resistance, and are unlikely to deform even when exposed to heat in subsequent steps. This permits the resin layer to successfully retain the shapes of microscopic projections and depressions, if so configured.

The crosslinked resin particles for use in the present invention is not limited to the types described above, and may be of the other-types if applicable to the present invention.

The amount of the light-scattering fine particles incorporated in the coating composition is suitably chosen depending upon the light scattering characteristics required and the type of light-scattering fine particles used. For illustrative purpose, the light-scattering fine particles are contained in the coating composition preferably in PWC (pigment weight concentration) of not exceeding 90%.

Also in the present method of fabricating a reflector, the coating film may be applied onto a base layer having a rough surface, i.e., having at its surface microscopic projections and depressions, so that the coating film, when heated, provides the reflecting layer in the form of a thin metal film configured to follow the shapes of microscopic projections and depressions of the base layer. In such an embodiment, the light incident on the rough surface of the reflecting layer is reflectively scattered, resulting in a widened angle of view.

The technique used to provide such a rough surface to the base layer is not particulalry specified. For exmaple, a coating composition containing organic fine particles, such as crosslinked resin particles, or inorganic fine particles may be applied to the base layer to form thereon a coating film having at its surface microscopic projections and depressions. Alternatively, a photolithographic technique can be utilized to form microscopic projections and depressions on a surface of a photosensitive resin layer.

Also in the present method of fabricating a reflector, a light-scattering layer may be provided on a reflecting layer such that the light reflected at the reflecting layer is scattered when it passes through the light-scattering layer. This construction also results in a widened angle of view.

The material used to form the aforementioned light-scattering layer is not particularly limited, as long as it permits the reflected light from the reflecting layer to be scattered when it passes through the light-scattering layer. For example, the light-scattering layer may be made from a clear coat containing the aforementioned light-scattering fine particles.

A reflective liquid crystal display ("LCD") device of the present invention is characterizes as incorporating the reflector fabricated according to the present method.

In the reflective LCD device of the present invention, a color filter layer may be provided on the reflecting surface side of the reflector. The color filter layer serves to color each pixel of the LCD device, thereby allowing the device to create the color display image. The color filter layer is generally configured to locate regions respectively colored in red (R), green (G) and blue (B). The technique used to form the color filter layer is not particulalry limited, and the color filter layer can be formed by prior art known techniques, including, for example, resist electrodeposition such as described in Japanese Patent Laying-Open No. Hei 4-247402, pigment dispersion such as described in Japanese Patent Laying-Open No. Hei 2-804, dyeing, printing, electrodeposition, transfering and the like. The color filter layer may be provided on an outermost layer of the reflector. Where the light scattering layer and/or clear layer are provided, the color filter layer may be provided to locate between the light-scattering layer and reflecting layer or between the clear layer and reflecting layer, for example.

In a particular case where the color filter layer is formed by electrodeposition techniques, including resist electrodeposition, the color filter layer may be deposited by using the thin metal film formed according to the present invention as an electrode.

In the reflective LCD device of the present invention, the color filter or light-scattering layer may be disposed on the side of reflecting surface of the reflector, or alternatively, on the viewer side of the substrate.

The reflective LCD device of the present invention can be applied to various LCDs, as long as those LCDs are of the type that display images by allowing incident light that has passed through a liquid crystal layer to reflect at a reflector surface. For exmaple, the reflective LCD device of the present invention can be applied to conventionally known operating mode LCDs, such as a TN (twisted nematic) mode LCD, an STN (super twisted nematic) mode LCD, GH (guest-host) mode LCD, and ferroelectric LCD. The reflective LCD device of the present invention can also be applied to conventionally known driving mode LCDs, regardless of whether those LCDs are driven in a simple or active matrix mode.

The coating composition of the present invention is particularly advantageous when used in the above-described method of the present invention for forming a thin metal layer, and is characterized as containing colloidal particles of noble metal or copper obtainable by reduing a compound of the noble metal or copper in the presence of a polymeric dispersant. The coating composition of the present invention can be prepared, for exmaple, by adding a solvent, alone or in combination with a binder resin, to a solid sol of noble metal or copper. Where only the solvent is added, specific examples of such solvents include aromatic solvents such as benzene, toluene and xylene; ketone solvents such as acetone, methylethyl ketone, methylisobutyl ketone and cyclohexanone; ether solvents such as diethyl ether, isopropyl ether, tetrahydrofuran, dioxane, ethylene glycol dimethyl ether, ethylene glycol diethyl ether, diethylene glycol dimethyl ether and diethylene glycol diethyl ether; ester solvents such as ethyl acetate, n-propyl acetate, isopropyl acetate, n-butyl acetate, methyl lactate, ethyl lactate, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, propylene glycol monomethyl ether acetate, propylene glycol monoethyl ether acetate, propylene glycol diacetate and γ-butyrolactone; and amide solvents such as dimethylformamide, dimethylacetamide and N-methyl-pyrrolidone. Among these solvents, ester and ketone solvents, either alone or in combination with one or more other solvents, may preferably be used. Alternatively, the coating composition of the present invention may be water-based. In such a case, a water-based solvent may be used.

The binder resin for use in the present invention can be chosen from those generally used as film-forming resins. Examples of binder resins include acrylic resins, vinyl chloride-vinyl acetate copolymerized resin, polyamide resins, epoxy resins, polyimide resins, urethane resins and polyester resins. In the case of curable resins, the preferred curable systems may be chosen from heat-curable systems such as containing epoxy, melamine and (block) isocyanate; oxydative polymerization systems; and photo-curable systems containing an photointiator. Cold cure resins may also be used, including cold cure acrylic, urethane, silicone and epoxy resins. If desired, various additives may further be incorporated in the coating composition. Such additives include waxes such as polyethylene wax and polypropylene wax, surfactants, coupling agents, plasticizers and dispersants, for example. Useful film-forming resins and crosslinkers are described below.

FILM-FORMING RESIN (A) Acrylic Resin:

The acrylic resin can be obtained from the regular polymerization of at least one type of monomers selected from the following three types of monomers; (1) hydroxyl-containing (meth)acrylic ester monomers such as hydroxylmethyl (meth)acrylate, hydroxyethyl (meth)acrylate, hydroxybutyl (meth)acrylate and N-methylolacrylamide, (2) carboxyl-containing ethylenically unsaturated monomers such as (meth)acrylic acid, crotonic acid, itaconic acid, fumaric acid and maleic acid, and (3) (meth)acrylic alkyl ester monomers such as methyl (meth)acrylate, ethyl (meth) acrylate, propyl (meth)acrylate, butyl acrylate, 2-ethylhexyl acrylate, n-octyl acrylate and n-dodecyl acrylate. By (meth) acrylic acid it is meant either acrylic acid or methacrylic acid. Copolymerizable (meth)acrylonitrile, styrene, (meth) acrylamide, dimethyl acrylamide, N,N-dimethylpropyl acrylamide or n-butoxymethyl acrylamide may further be blended. A number-average molecular weight of the acrylic resin obtained is preferably in the range of 1,800–100,000, more preferably in the range of 5,000–20,000.

(B) Polyester Resin:

The polyester resin is obtained from polycondensation (esterification) of polyols with polybasic acids or their anhydrides.

Examples of polyols include ethylene glycol, propylene glycol, 1,3-butylene glycol, 1,6-hexandiol, diethylene glycol, dipropylene glycol, neopentyl glycol, triethylene glycol, glycerine, trimethylolethane, trimethylolpropane, pentaerythritol, dipentaerythritol and the like. These polyols may be used alone or in any combination thereof.

Examples of polybasic acids or their anhydrides include phthalic acid, phthalic anhydride, isophthalic acid, terephthalic acid, succinic acid, succinic anhydride, adipic acid, azelaic acid, sebacic acid, tetrahydrophthalic anhydride, hexahydrophthalic anhydride, maleic anhydride, fumaric acid, itaconic acid, trimellitic anhydride and the like. These substances may be used alone or in any combination thereof. A number-average molecular weight of the polyester resin obtained is preferably in the range of 200–10,000, more preferably in the range of 300–6,000.

CROSSLINKER

Useful crosslinkers include polybasic acids or their anhydrides (those listed above, for example), amino resins such as a melamine resin, blocked polyisocyanate compounds, and the like. Two-pack type polyurethane, silicone resins and the like which can be cured by air drying may also be used.

(A) Amino Resin:

Examples of amino resins include condensation products prepared by reacting a mixture containing one or more of amino compounds, such as melamine, urea and benzoguanamine, with formaldehyde; and alkyl etherified melamine resins prepared by reacting the aforementioned condensation products with lower alcohols such as methanol, butanol and the like. Preferably, such alkyl etherified melamine resins have a number-average molecular weight within the range of 400–1,200.

Preferred is an amino resin containing, on average, from 0 to 1 imino groups per triazine ring. Particularly preferred is an amino resin containing, on average, from 0 to 0.2 imino groups per triazine ring. Alkyl ether groups and the like are attached to the remaining sites. The average number of imino groups per triazine ring is calculated from proportions in weight of carbon, hydrgen and nitrogen, as determined by elementary analysis, and a molar ratio NH/—NCH$_2$OR, as determined by $^1$H-NMR.

(B) Blocked Polyisocyanate Compound:

Examples of blocked polyisocyanate compounds include those prepared by partially or completely blocking, with the use of a blocking agent, functional groups in polyisocyanate compounds which includ aliphatic polyfunctional isocyantes such as hexamethylene diisocyanate (HMDI), alicyclic polyfunctional isocyanates such as isophorone diisocyanate (IPDI), diphenylmethane-4,4'-diisocyanate (MDI), hydrogenated MDI and the like.

FORMULATION

The film-forming resin and the crosslinker are blended in proportions by weight of 90–50% to 10–50%, preferably 85–60% to 15–40%, when calculated on the solids content basis. If the proportion of crosslinker is below 10% by weight (if the proportion of film-forming resin exceeds 90% by weight), a crosslinking level of a resulting coating film may become insufficient. On the other hand, if the proportion of crosslinker exceeds 50% by weight (if the proportion of film-forming resin is below 50% by weight), a storage stability of the coating composition may be reduced. The increased cure rate may also result which disadvantageously provides a poor film appearance.

SOLVENT

Any solvent which can dissolve or disperse the film-forming resin can be used. The coating composition may be organic solvent-based, or in the form of non-aqueous dispersion, aqueous solution or aqueous dispersion. In the case of aqueous-based coating composition, an appropriate amount of hydrophilic organic solvent may be incorporated therein. Useful organic solvents include hydrocarbons such as toluene and xylene; ketones such as acetone and methylethyl ketone; esters such as ethyl acetate, cellosove acetate and butyl cellosove; alcohols and the like.

Preferably, a total weight of the film-forming resin and crosslinker incorporated in the coating composition is suitably adjusted so that the coating composition is allowed to contain the colloidal particles of noble metal or copper and polymeric dispersant in the amount of at least 10% by weight, calculated on the solids content basis.

SOLID SOL AND COLLOIDAL SOLUTION OF NOBLE METAL OR COPPER

The solid sol and colloidal solution of noble metal or copper, for use in the present invention, contain colloidal particles of the noble metal or copper, as well as a polymeric dispersant. The colloidal particles of noble metal or copper can be prepared from a compound of the noble metal or copper.

The type of the aforementioned noble metal is not particularly specified, and may be gold, silver, ruthenium, rhodium, palladium, osmium, iridium, platinum or the like, for example. Particularly preferred are gold, silver and platinum.

Any substance which contains noble metal or copper can be used for the aforementioned compound of noble metal or copper. Representing examples are chloroauric acid, silver nitrate, silver acetate, silver perchlorate, chloroplatinic acid, potassium chloroplatinate, copper (II) chloride, copper (II) acetate, copper (II) sulfate, and the like.

The aforementioned polymeric dispersant is an amphiphilic copolymer into which a functional group having a high affinity for a pigment surface has been introduced. In the present invention, such a polymeric dispersant acts as a protective colloid for the colloidal particles of noble metal or copper. This permits the production of microfine particles of noble metal or copper in their stable state.

The type of the polymeric dispersant is not particularly specified, and can be suitably selected from the following three types of polymers:

(1) "Comb" polymers having pigment-affinitive groups in its backbone and/or plural side chains, as well as having plural side chains constituting solvation sites;

(2) Polymers having, in the backbone, plural pigment-affinitive sites constituted by plural pigment-affinitive groups; and (3) Straight-chain polymers having, at one terminal of the backbone, a pigment-affinitive site constituted by a pigment-affinitive group.

The term "pigment-affinitive group", as used herein, refers to the group having a strong affinity for adsorbing pigment surfaces. Examples of the pigment-affinitive groups include tertiary amino, quarternary ammonium, a heterocyclic group containing a basic nitrogent atom, hydroxyl, carboxyl and the like for organosols; and phenyl, lauryl, stearyl, dodecyl, oleyl and the like for hydrosols. Those pigment-affinitive groups exhibit a strong affinity for noble metal or copper. Due to the inclusion of pigment-affinitive groups, the aforementioned polymeric dispersant serves effectively as a protective colloid for noble metal or copper.

The polymers of type (1) have such a structure that one group of side chains constituting the solvation sites, together with another group of side chains having the pigment-affinitive groups, branch off from a backbone chain, just like the teeth of a comb. The polymers having such a structure are referred to as the "comb" polymers in this specification. In the comb polymers of type (1), the pigment-affinitive groups may be present either at a terminal or in the middle of each side chain, or in the backbone. The aforementioned solvation site has a strong affinity for solvents and may be of either hydrophilic or hydrophobic structure. The solvation site may consist of a water-soluble or lipophilic polymer chain, for example.

Various known comb polymers can be used as the polymers of type (1). One example is a poly(ethylene-imine) or its salt, as disclosed in Japanese Patent Laying-Open No. Hei 5-177123, which is configured to have at least one poly(carbonyl-$C_3$~$C_6$-alkyleneoxy) chain, each of which has from 3 to 80 carbonyl-$C_3$~$C_6$-alkyleneoxy groups and is linked to poly(ethylene-imine) via bridging amide or salt. Another example is a reaction product of poly(lower alkylene) imine and free carboxyl-containing polyester, as disclosed in Japanese Patent Laying-Open No. Sho 54-37082. At least two polyester chains are linked to each poly(lower alkylene) imine chain. Another example is a pigment dispersant, as disclosed in Japanese Patent Publication No. Hei 7-24746, which is obtained by the simultaneous or sequential reaction of a high-molecular weight epoxy compound having a terminal epoxy group with an amine compound and a carboxyl-containing prepolymer having a number-average molecular weight of 300–7,000.

The aforementioned comb polymers of type (1) preferably contain 2–3,000 pigment-affinitive groups in a molecule. If the number of pigment-affinitive groups present in a molecule is below 2, the dispersion stability may become insufficient. On the other hand, if it exceeds 3,000, the viscosity may become too high to result in the sufficient handling property. The widened particle size distribution of the colloidal particles may also result. The more preferred number is in the range of 25–1,500.

The aforementioned comb polymers of type (1) preferably contain 2–1,000 groups of side chains constituting the solvation sites in a molecule. If the number of groups of side chains present in a molecule is below 2, the dispersion stability may become insufficient. On the other hand, if it exceeds 1,000, the viscosity may become too high to result in the sufficient handling property. The widened particle size distribution of the colloidal particles may also result. The more preferred number is in the range of 5–500.

The comb polymers of type (1) preferably have number-average molecular weights in the range of 2,000–1,000,000, more preferably in the range of 4,000–500,000. If the number-average molecular weight of the comb polymer is below 2,000, the dispersion stability may become insufficient. On the other hand, if it exceeds 1,000,000, the viscosity may become too high to result in the sufficient handling property. The widened particle size distribution of the colloidal particles may also result.

The aforementioned polymers of type (2) have plural pigment-affinitive groups arranged along the backbone. The pigment-affinitive groups may be pendant groups that stem from the backbone, for example. One or more of the pigment-affinitive group is located at each solvation site which thus functions as an anchor that adsorbs to a pigment surface.

The polymers of type (2) are described in several references, for example. One example is a reaction product of polyisocyanate, a mixture of a monohydroxy compound with monohydroxy monocarboxylic acid or a monoamino-monocarboxylic acid compound, and a compound having at least one basic endocyclic nitrogen and an isocyanate-reactive group, as disclosed in Japanese Patent Laying-Open No. Hei 4-210220. Another example is a polymer having plural tertiary amino groups or basic endocyclic nitrogen atom-containing groups that pendantly stem from the polyurethane/polyurea backbone, as disclosed in Japanese Patent Laying-Open Nos. Sho 60-16631, Sho 63-241018 and Hei 2-612. Another example is a copolymer consisting of a water-solble poly(oxyalkylene) group-containing strically stabilized unit, a structural unit and an amino-containing unit, as disclosed in Japanese Patent Laying-Open No. Hei 1-279919. The amino-containing monomeric unit contains a tertiary amino group, its acid adduct group or a quarternary ammonium group, and 0.025–0.5 milliequivalents of an amino group is contained per 1 g of the copolymer. Another example is an amphiphilic polymer consisting of an addition polymer backbone and a stabilizer unit of at least one C1~C4 alkoxypolyethylene or polyethylene-copropylene glycol (meth)acrylate, and having a weight-average molecular weight in the range of 2,500–20,000, as disclosed in Japanese Patent Laying-Open No. Hei 6-100642. The backbone contains up to 30 weight % of a non-functional structural unit and up to 70 weight %, in total, of the stabilizer unit and a functional unit. The functional unit consists of a collection of a substituted or unsubstituted styrene-containing unit, a hydroxyl-containing unit and a carboxyl-containing unit, such that the ratio of the hydroxyl to caboxyl group is 1:0.10~26.1, the ratio of the hydroxyl to styrene group is 1:0.28~25.0 and the ratio of the hydroxyl to propyleneoxy or ethyleneoxy group is 1:0.80~66.1.

The polymers of type (2) preferably contain 2–3,000 pigment-affinitive groups in a molecule. If the number of pigment-affinitive groups present in a molecule is below 2, the dispersion stability may become insufficient. On the other hand, if it exceeds 3,000, the viscosity may become too high to result in the sufficient handling property. The widened particle size distribution of the colloidal particles may also result. The more preferred number is in the range of 25–1,500.

The polymers of type (2) preferably have number-average molecular weights in the range of 2,000–1,000,000, more preferably in the range of 4,000–500,000. If the number-average molecular weight is below 2,000, the dispersion stability may become insufficient. On the other hand, if it exceeds 1,000,000, the viscosity may become too high to result in the sufficient handling property. The widened particle size distribution of the colloidal particles may also result.

The aforementioned polymers of type (3) have, at one terminal of the polymer backbone, pigment-affinitive sites constituted by a single or plural pigment-affinitive groups, and exhibit an sufficient affinity for pigment surfaces.

Examples of polymers of type (3) are described in several references. A first example is an A-B type block polymer with either A or B being basic, as disclosed in Japanese Patent Laying-Open No. Sho 46-7294. A second example is an A-B type block polymer prepared by introducing aromatic carboxylic acid into the A block, as disclosed in U.S. Pat. No. 4,656,226. A third example is an A-B type block polymer having a basic terminal group, as disclosed in U.S. Pat. No. 4,032,698. A fourth example is an A-B type block polymer having an acidic terminal group, as disclosed in U.S. Pat. No. 4,070,388. A fifth example is a polymer having an enhanced resistance to yellowing by weather, as disclosed in Japanese Patent Laying-Open No. Hei 1-204914, which is a modification of the A-B type block polymer disclosed in the above-cited U.S. Pat. No. 4,656,226.

The polymers of type (3) preferably contain 2–3,000 pigment-affinitive groups in a molecule. If the number of pigment-affinitive groups present in a molecule is below 2, the dispersion stability may become insufficient. On the other hand, if it exceeds 3,000, the viscosity may become too high to result in the sufficient handling property. The widened particle size distribution of the colloidal particles may also result. The more preferred number is in the range of 5–1,500.

The polymer of type (3) preferably have number-average molecular weights in the range of 1,000–1,000,000, more preferably in the range of 2,000–500,000. If the number-average molecular weight is below 1,000, the dispersion stability may become insufficient. On the other hand, if it exceeds 1,000,000, the viscosity may become too high to result in the sufficient handling property. The widened particle size distribution of the colloidal particles may also result.

The aforementioned polymeric dispersant may be selected from those commercially avilable. The commercially available polymeric dispersants include SOLSPERSE #20000, SOLSPERSE #24000, SOLSPERSE #26000, SOLSPERSE #27000 and SOLSPERSE #28000 (products of Zeneka Co., Ltd.), DISPERBIC #160, DISPERBIC #161, DISPERBIC #162, DISPERBIC #163, DISPERBIC #166, DISPERBIC #170, DISPERBIC #180, DISPERBIC #182, DISPERBIC #184 and DISPERBIC #190 (products of Pikchemy Co., Ltd.), EFKA-46, EFKA-47, EFKA-48 and EFKA-49 (products of EFKA Chemical Co., Ltd.), Polymer #100, Polymer #120, Polymer #150, Polymer #400, Polymer #401, Polymer #402, Polymer #403, Polymer #450, Polymer #451, Polymer #452 and Polymer #453 (products of EFKA Chemical Co., Ltd.), AJISPER PB711, AJISPER PA111, AJISPER PB811 and AJISPER PW911 (products of Ajinomoto Co., Ltd.), FLOREN DOPA-158, FLOREN DOPA-22, FLOREN DOPA-17, FLOREN TG-730W, FLOREN G-700 and FLOREN TG-720W (products of Kyoeisha Chemical Co., Ltd.), for example.

As stated above, the polymeric dispersant may have a graft structure (represented by the comb polymers of type (1)) that includes side chains on which the pigment-affinitive groups are located to provide the solavation sites, or alternavitly, have pigment-affinitive groups in the backbone (as represented by the polymers of types (2) and (3)). Because of such structrual characteristics, the polymeric dispersant exibits the enhanced ability to hold colloidal particles in suspension, and is rendered suitable for use as a protective colloid for the colloidal particles of noble metal or copper. The use of the aforementioned polymeric dispersant results in obtaining a concentrated dispersion of colloidal particles of noble metal or copper.

The polymeric dispersant is preferably incorporated in the coating composition in the amount preferably of 50–1,000 parts by weight, more preferably of 100–650 parts by weight, based on 100 parts by weight of the noble metal or copper. If the amount of polymeric dispersant is below 50 parts by weight, the dispersion of the colloidal particles of noble metal or copper may become insufficient. On the other hand, if it exceeds 1,000 parts by weight, a ratio in weight of the polymeric dispersant to a vehicle, when blended in the coating composition, may be increased to a level that causes undesirable results, such as in physical properties.

In the solid sol and colloidal solution of noble metal or copper for use in the present invention, the colloidal particles of noble metal or copper are preferably present in concentrations of at least 50 mmol (mM) per kilogram of the aforementioned polymeric dispersant. 100 mmol (mM) or higher is more preferred.

In the solid sol of noble metal or copper for use in the present invention, the colloidal particles of noble metal or copper preferably have a volume-average particle size of 5–150 nm. It is also preferred that the solid sol of noble metal or copper shows a narrow particle size distribution.

In the colloidal solution of noble metal or copper for use in the present invention, the colloidal particles of noble metal or copper preferably have an average particle size of 5–30 nm.

The silid sol of noble metal or copper can be prepared, for exmaple, by dissolving a compound of the noble metal or copper into a solvent, adding a polymeric dispersant thereto, reducing the compound to noble metal or copper to thereby form colloidal particles protected by the polymeric dispersant, and subsequenly romoving the solvent. The colloidal solution of noble metal or copper can be prepared, for example, by dissolving a compound of the noble metal or copper into a solvent, adding a polymeric dispersant thereto, and reducing the compound to noble metal or copper.

The type of the solvent used to dissolve the noble metal or copper compound is not particularly limited, so long as it can dissolve the particular noble metal or copper compound used. The solvent may be water, or organic such as acetone, methanol, ethylene glycol or ethyl acetate, for example. These solvents may be used alone or in any combination thereof. In the case where water is used in combination with an organic solvent, such a solvent is preferably water-soluble.

Where the solvent used is water, a colloidal solution is obtained in the form of hydrosol. In such an instance, the noble metal or copper compound is preferably dissolved in water at concentrations of at least 50 mM. The concentrations of below 50 mM result in the failure to obtain a concentrated colloidal solution. 100 mM or higher is more preferred.

Where the solvent used is organic, a colloidal solution is obtained in the form of organosol. In such an instance, the noble metal or copper compound is preferably dissolved in the organic solvent at concentrations of at least 10 mM. The concentrations of below 10 mM result in the failure to obtain a concentrated colloidal solution. 50 mM or higher is more preferred.

In the case where a mixed solution of water and a water-soluble organic solvent is used, the noble metal or copper compound is first dissolved in water to which the polymeric dispersant dissolved in the water-soluble organic solvent is subsequently added. Initially dissolving the noble metal or copper compound into water results in preparing a more concentrated organosol. In this case, the noble metal or copper compound is preferably dissolved in water at concentrations of at least 50 mM. The concentrations of below 50 mM result in the failure to obtain a concentrated solid sol or colloidal solution that contains higher proportions of colloidal particles of noble metal or copper. 100 mM or higher is more preferred.

If the noble metal is silver, the aforestated aqueous solution is preferably kept at pH 7 or lower. If its pH value exceeds 7, in an exemplary case where silver nitrate is used as the noble metal compound, a side product, such as silver oxide, may be undesirably produced during reduction of silver ions, resulting in obtaining the aqueous solution colored in cloudy white. Accordingly, in such a case, the aqueous solution should be adjusted to a target pH of not exceeding 7, for exmaple, by the addition of an about 0.1 N nitric acid.

The aforementioned water-soluble organic solvent is added to water into which the noble metal or copper compound dissolve, preferably in proportions by volume of 1:1 or higher. If the proportion by volume of the water-soluble organic solvent is below 1.0, a polymeric dispersant for solvent-based coating compositions may not be dissolved thereinto. 5.0 or higher is more preferred.

In the case where the solvent is in the form of the aforementioned mixed solvent of water and water-soluble organic solvent, the polymeric dispersant added to a solution of the noble metal or copper compound is preferably water-insoluble. If it is water-soluble, the attempt to obtain a solid sol by removing the water-soluble organic solvent may fail because of the difficulty to separate the colloidal particles. Examples of the water-insoluble polymeric dispersants include DISPERBIC #161, DISPERBIC #166 (products of Pikchemy Co., Ltd.), SOLSPERSE #24000 and SOLSPERSE #28000 (products of Zeneka Co., Ltd.).

After the addition of the aforementioned polymeric dispersant to the noble metal or copper compound solution, the noble metal ions or copper ions present therein are reduced. Reduction of the noble metal or copper ions can be accomplished by various methods, such as by irradiation with a high-pressure mercury lamp or chemically with the addition of a reducing agent.

Such a reducing agent is not particularly specified in type and can be chosen from those conventionally used in the art. Examples of reducing agents include alkaline boron hydrides such as sodium boron hydride; hydrazine compounds; citric acid or its salts; and succinic acid or its salts. Besides the above-listed reducing agents, alkanolamine can also be used.

The use of alkanolamine as a reducing agent is not popular. However, when alkanolamine is added to and mixed with agitation with the noble metal or copper compound solution, noble metal ions or copper ions present therein can be reduced at about ordinary temperature to noble metal or copper. The use of alkanolamine for reduction of noble metal or copper compounds not only eliminates the necessity of using highly hazardrous and toxic reducing agents, but also eliminates the need to supply heat or install a special irradiating apparatus.

Any types of alkanolamines can be utilized, including dimethylethanol amine, triethanol amine, ethanol amine, diethanol amine, methylethanol amine, methyldiethanol amine, propanol amine, 2-(3-aminopropylamino) ethanol, butanol amine, hexanol amine, dimethylpropanol amine and the like, for example.

The amount of alkanolamine used is preferably in the range of 1–20 moles, more preferably in the range of 2–8 moles per mole of the aforementioned solution of noble metal or copper compound. If it is below 1 mole, the insufficient reduction may result. On the other hand, if it exceeds 20 moles, resulting colloidal particles may be less stabilized against flocculation.

While being expensive and difficult to handle, the use of sodium boron hydride as a reducing agent permits the reduction at ordinary temperature, thereby eliminating the need to supply heat or install a special irradiating apparatus.

The amount of sodium boron hydride used is preferably in the range of 1–50 moles, more preferably in the range of 1.5–10 moles per mole of the aforementioned solution of noble metal or copper compound. If it is below 1 mole, the insufficient reduction may result. On the other hand, if it exceeds 50 moles, resulting colloidal particles may be less stabilized against flocculation.

In the case where citric acid or its salt is used as a reducing agent, the solution of noble metal or copper compound may be heat refluxed in the presence of alcohol to reduce the noble metal or copper ions. The use of citric acid or its salt is fovored since it is very low in price and readily available in commerce. The use of sodium citrate is preferred.

The amount of citric acid or its salt added is preferably in the range of 1–50 moles, more preferably in the range of 1.5–10 moles per mole of the aforementioned solution of noble metal or copper compound. If it is below 1 mole, the insufficient reduction may result. On the other hand, if it exceeds 50 moles, resulting colloidal particles may be less stabilized against flocculation.

In the preparation of the solid sol for use in the present invention, after reduction of noble metal or copper ions, colloidal particles of noble metal or copper protected by the polymeric dispesant are allowed to pricipitate and the solvent is subsequnetly removed. In the case where the mixed solvent of water and water-soluble organic solvent is used, desolvating can be accomplished by the following procedures commensurate with the types of the polymeric dispersant used.

In the case of water-insoluble polymeric dispersant, desolvating may be achieved by first removing the water-soluble organic solvent, as by vaporization, to allow the colloidal particles of noble metal or copper protected by the polymeric dispersant to precipitate, and then removing water. Due to the water-insoluble nature of the polymeric dispersant, the removal of the water-soluble organic solvent results in precipitation of the colloidal particles of noble metal or copper protected by the polymeric dispersant.

In such an instance, the water-soluble organic solvent preferably has a property of evaporating at a higher rate than water. If its evaporation rate is lower than that of water, in the case where the water-insoluble polymeric dispersant is used, the attempt to first remove the water-soluble organic solvent may fail to accordingly result in the failure to precipitate the colloidal particles of noble metal or copper.

In the case of solvent-based polymeric dispersant, an excess amount of a nonpolar organic solvent which has no tendencty to dissolve the polymeric dispersant may be added to allow the colloidal particles of noble metal or copper protected by the polymeric dispersant to precipitate, prior to desolvating as by decantation.

The colloidal particles of noble metal or copper protected by the polymeric dispersant, if residual ions are present therein, may be caused to flocculate in the coating composition. The absence of residual ions is accordingly preferred. Those residual ions are generally removed, together with the solvent, during the desolvating procedure. Preferably, after removal of the solvent, the colloidal particles of noble metal or copper protected by the polymeric dispersant are washed with an ion-exchange water. In the aforestated case where the colloidal particles of noble metal or copper protected by the polymeric dispersant are allowed to precipitate by the addition of an excess amount of the nonpolar organic solvent, they may be washed with the nonpolar organic solvent.

After removal of the solvent, the pricipitated colloidal particles of noble metal or copper are dried to provide the solid sol of noble metal or copper for use in the present invention. The solid sol of noble metal or copper, as prepared according to the above-described procedures, contains colloidal particles of noble metal or copper at higher concentrations, compared to those prepared by conventional methods. Also, the obtained solid sol of noble metal or copper has an average colloididal particle size of 5–150 nm, for example, as well as showing a narrow particle size distribution which contributes to the uniform formation of a thin metal film.

In accordance with the above-described procedures to prepare a colloidal solution of noble metal or copper for use in the present invention, a colloidal solution of noble metal or copper can be obtained at concentrations of at least 50 mM for hydrosols, and at concentrations of at least 10 mM for organosols. The obtained colloidal solution has an average colloidal particle size of 5–30 nm, for example, and shows a narrow particle size distribution.

In accordance with the above-described procedures, the solid or colloidal solution of noble metal or copper can be prepared in a simplified fashion, i.e., by a few steps of dissolving the noble metal or copper compound into the solvent to form a solution, adding the polymeric dispersant to the solution and reducing noble metal or copper ions to noble metal or copper. The resulting solid sol or colloidal solution of noble metal or copper is permitted to contain a higher concentration of colloidal particles of noble metal or copper, compared to conventional solid sols or colloidal solutions of noble metal. In particular, the use of alkanolamine permits the simplified preparation thereof in milder conditions.

In the case where the colloidal solution of noble metal or copper for use in the present invention is prepared from an aqueous solution of noble metal or copper compound, the aqueous colloidal solution may preferably be deionized before it is incorporated into the coating composition. Deionizing the aqueous solution results in more stabilizing the colloidal particles of noble metal or copper in the coating composition against flocculation. This effectively suppresses the undesired reduction in storage stability and workability of the coating composition.

DESCRIPTION OF THE PREFERRED EMBODIMENTS

Figure 1:
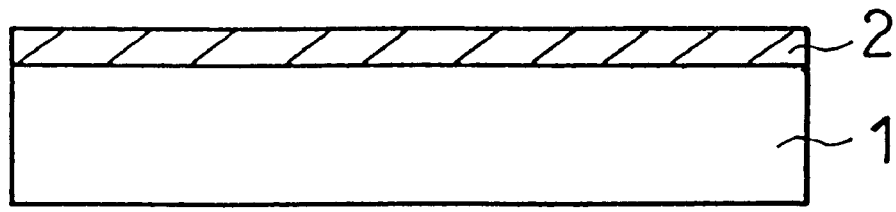
FIG. 1 is a schematic sectional view of a coating film provided on a substrate, illustating the practice of a method of the present invention for forming a thin metal film.

FIG. 1 is a schematic sectional view, illustrating one embodiment employed to practice the method of the present invention for forming a thin metal film. A coating composition containing colloidal particles of noble metal or copper is applied onto a substrate 1. The subsequent drying to remove a solvent from the coating composiiton results in the formation of a coating film 2 which contains the colloidal particles of noble metal or copper and a polymeric dispersant. The coating film may further contain a binder resin, if the selected coating composition contains the binder resin.

Subsequently, heat is applied to the coating film 2 so that the colloidal particles present therein are fused together to form a thin metal film 2. In general, the thin metal film 2 is electrically conductive and has a metallic luster as if by plating. Accordingly, such a thin metal film can be used to form conductive circuit elements including electrodes and conductive paths or wiring. Such conductive circuit elements may be pattern formed as by a screen printing technique using the coating composition. Alternatively, a thin metal film may be provided over an entire surface of a substrate, followed by pattern etching thereof using a lithographical technique or the like.

The material type of substrate 1 is not particularly limited, as long as it can withstand high temperatures used to heat the coating film 2. The substrate 1 may be a semiconductor substrate, a printing substrate, a substate for use in thermal heads or electronic parts. The substrate 1 may be made from a heat-resistant resin such as polyimide.

Figure 2:
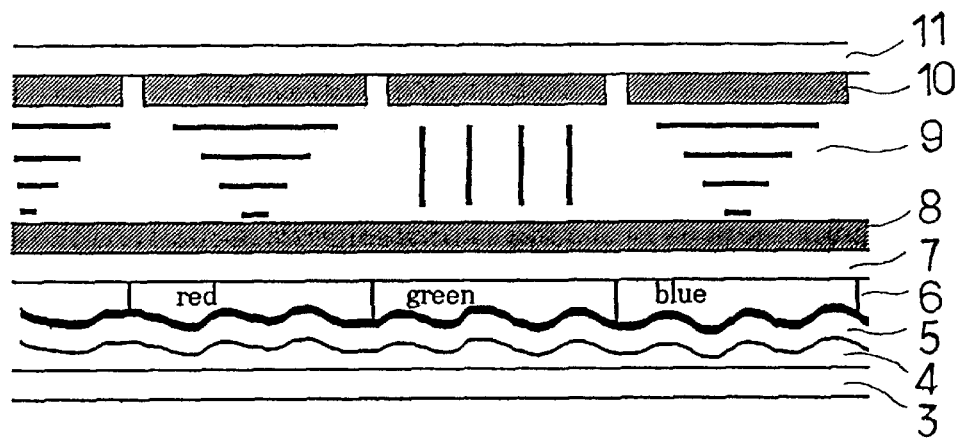
FIG. 2 is a schematic sectional view of one embodiment of the reflective LCD device in accordance with the present invention.

FIG. 2 is a schematic sectional view, showing one embodiment of the reflective liquid crystal display ("LCD") device in accordance with the present invention. Provided on a lower substrate 3 is a layer 4 having at its surface microscopic projections and depressions. The material type of the substrate 3 may be chosen from those generally used in the LCD art, such as glass or plastic. The layer 4 may be in the form of a coating film provided by application of a coating composition containing a binder resin and light-scattering fine particles, such as organic or inorganic fine particles, or alternatively, in the form of a photosensitive resin layer whose surface is photo-etched, as by a photo-lithographic process, to define microscopic projections and depressions thereon.

Overlying the layer 4 is a reflecting layer 5 in the form of a thin metal film formed according to the present method. Specifically, this thin metal film is formed by applying, in the form of a film, a coating composition containing the colloidal particles of noble metal or copper onto the layer 4 and then applying heat to the coating film.

Overlying the reflecting layer 5 is a color filter layer 6 on which a planarizing layer 7 is provided. The planarizing layer 7 may be in the form of a transparent coating film, such as of an acrylic resin.

Disposed on the planarizing layer 7 is a lower transparent active electrode 8 comprised of ITO film or the like. An upper substrate 11 is formed of material, either similar or dissimilar to the material of the lower substrate 3. Underlying the upper substrate 11 is an upper transparent active electrode 10 formed of ITO film or the like. Interposed between the lower and upper transparent active electrodes 8 and 10 is a liquid crystal layer 9.

The light that enters the LCD device is reflected at a surface of the reflecting layer 5. Since the reflecting layer 5 has a surface profile following the microscopic roughness of the underlying layer 4, as stated above, the light incident on the refelcting layer surface from various directions is reflectively scattered in a direction perpendicular to a display screen.

Figure 3:
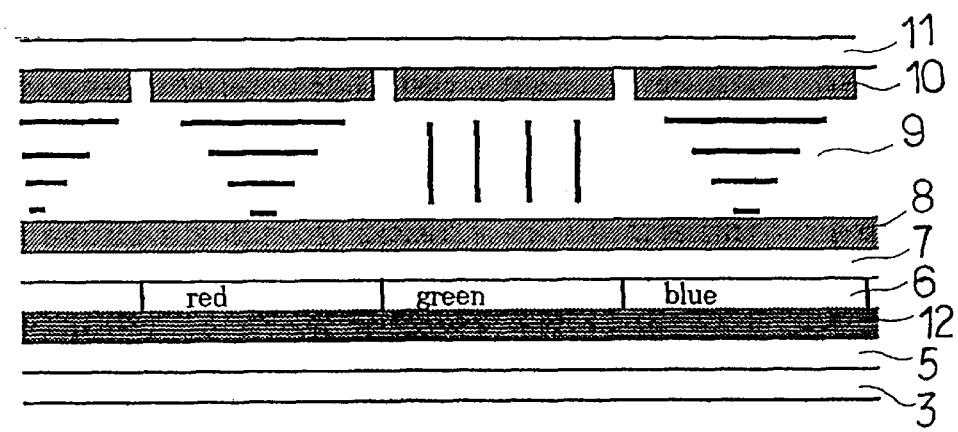
FIG. 3 is a schematic sectional view of another embodiment of the reflective LCD device in accordance with the present invention.

FIG. 3 is a schematic sectional view, showing another embodiment of the reflective LCD device in accordance with the present invention. Overlying the lower substrate 3 is the reflecting layer 5 in the form of a thin metal film formed according to the present method, as analogous to the embodiment shown in FIG. 2. Overlying the reflecting layer 5 is a light-scattering layer 12. The light-scattering layer 12 may be in the form of a clear coating film containing a binder resin and light-scattering fine particles, such as organic or inorganic fine particles. As analogous to the embodiment shown in FIG. 2, a sequence of the color filter layer 6, planarizing layer 7, lower transparent active electrode 8, liquid crystal layer 9, upper transparent active electrode 10 and upper substrate 11 is provided to overlie the light-scattering layer 12.

The light entering the LCD device is reflected at a surface of the reflecting layer 5. Due to the presence of the light-scattering fine particles in the light-scattering layer 12, the reflected light is scattered when it passes through the light-scattering layer 12. Accordingly, the light entering the device from various directions can be reflectively scattered also in a direction perpendicular to a display screen.

In the embodiment shown in FIG. 3, in the case where the light-scattering layer 12 is made from a coating film, the light-scattering layer 12 may be applied onto the reflecting layer by a wet-on-wet technique, followed by a single step to simultaneously heat those two layers 5 and 12.

The reflective LCD devices shown in FIGS. 2 and 3 may be converted to half-transmissive reflective LCD devices by rendering the reflecting layer 5 half-silvered or half-transmissive. In such a case, a light source, such as a backlight, may further be provided behind or under the lower substrate 3.

Those skilled in the art will recognize that the LCD device of the present invention is not limited to those constructions shown in FIGS. 2 and 3.

EXAMPLES

The presen invention will be now described in detail with reference to non-limiting examples. All parts and percentages used in the following examples are by weight unless otherwise spcified.

Preparation Example

Preparation of Crosslinked Resin Particles

A reactor equipped with a stirring and heating unit, thermostat, nitrogen line, condenser and decanter was charged with 213 parts of bis(hydroxyethyl)taurine, 208 parts of neopentyl glycol, 296 parts of phthalic anhydride, 376 parts of azelaic acid and 30 parts of xylene. The mixture was then heated to initiate a reaction. Water produced during the reaction was removed in the form of azeotropic mixture with xylene. A temperature of the reaction mixture was controlled to reach 210° C. in about 3 hours from the start of reflux. Stirring and dewatering were continued until an acid value indicating the amount of carboxylic acid reached 135 mgKOH/g. After the reaction mixture was cooled to 140° C., 500 parts of glycidyl ester of verstic acid, "CARDURA E10" (name used in trade and manufactured by Shell Chemical), was added dropwise thereto over 30 minutes. After the subsequent 2-hour stirring, the reaction was terminated. As a result, a polyester resin containing a zwitter ion group was obtained. This polyester resin had an acid value of 55 mgKOH/g, a hydroxyl value of 91 mgKOH/g and a number-average molecular weight of 1,250.

A mixture containing 10 parts of the polyester resin containing a zwitter ion group, 140 parts of deionized water, 1 part of dimethylethanol amine, 50 parts of styrene and 50 parts of ethylene glycol dimethacrylate was vigorously stirred in a stainless steel beaker to prepare a monomer dispersion. Also, 0.5 parts of azobiscyanovaleic acid, 40 parts of deionized water and 0.32 parts of dimethylethanol amine were mixed to prepare an aqueous initiator.

A reactor equipped with a stirring and heating unit, thermostat, nitrogen line and condenser were charged with 5 parts of the aforementioned polyester resin having a zwitter ion group, 280 parts of deionized water and 0.5 parts of dimethylethanol amine. The reaction mixture was then elevated in temperature to 80° C. 251 parts of the monomer dispersion and 40.82 parts of the aqueous initiator were concurrently added dropwise to the reaction mixture over 60 minutes. The reaction was continued for another 60 minutes and then terminated to obtain an emulsion containing crosslinked resin particles.

Xylene was added to the above-obtained emulsion, and dewatering was accomplished by azeotropic distillation under a reduced pressure to substitute xylene for the medium, so that the crosslinked resin particles were obtained in the form of 20%, by weight, solids in xylene.

Synthesis Example 1

Preparation of a Solid Sol of Silver

Poured into a beaker was 10 ml of a 100 mM aqueous silver nitrate which was subsequently diluted with 90 ml of acetone. 1 g of a polymeric dispersant, SOLSPERSE #28000 (name used in trade and manufactured by Zeneka Co., Ltd.), was dissolved into the beaker content. After the polymeric dispersant was completely dissolved thereinto, 5 ml of dimethylethanol amine was added to obtain a colloidal solution of silver.

The colloidal solution obtained was heated under a reduced pressure to remove acetone, resulting in deposition and precipitation of colloidal silver. A supernatant water phase was removed by decantation. The precipitate was washed with an ion-exchange water, and then dried completely to obtain a solid sol of silver.

Example 1

Propylene glycol monomethyl ether acetate ("PMAC") was added to the solid sol of silver, as prepared in Synthesis Example 1, to prepare a 25 wt. % colloidal solution. The colloidal solution obtained was spin coated onto a glass plate, oven dried at 160° C. for 10 minutes to remove the solvent, and oven calcined at 250° C. for 1 hour. As a result, a thin metal film composed of silver was formed having a metallic luster. Its thickness was 0.2 $\mu$m and its surface resistivity was 0.2 $\Omega/\square$ when measured with ROLESTER (manufactured by Mitsubishi Yuka Co., Ltd.).

Example 2

A coating composition containing the solid sol of silver, as prepared in Synthesis Example 1, was prepared according to the following formulation.

| Ingredients | Parts by weight | Solids content[1] |
|---|---|---|
| thermosetting acrylic resin A[2] | 30.0 | 30 |
| UBAN 20N-60[3] | 16.7 | 10 |

-continued

| Ingredients | Parts by weight | Solids content[1] |
| --- | --- | --- |
| solid sol of silver[4] | 50.0 | 50 |
| TTO-55B[5] | 10.0 | 10 |
| xylene | 200.0 | |
| PMAC[6] | 693.3 | |
| Total | 1000.0 | 100 |

[1]Percent by weight
[2]Having a hydroxyl value of 45, an acid value of 15 and a number-average molecular weight of 18,000
[3]Butylated melamine having a solids content by weigh of 60% (product of Mitsui Toatsu Co., Ltd.)
[4]Prepared in Synthesis Example 1
[5]Fine particles of titanium oxide, manufactured by Ishihara Sangyo Co., Ltd.
[6]Propylene glycol monomethyl ether acetate The coating composition prepared was coated on a glass plate by a roll coater, heated on a hot plate at 150° C. for 1 minute, and oven calcined at 250° C. for 2 hours to form a thin metal film. Due to the inclusion of the titanium oxide particles, the thin metal film had microscopic projections and depressions at its surface. The thin metal film thus imparted thereto a light-scattering property. Its thickness was 2.0 μm. A spectral reflectance of the thin metal film was 70%, when measured by a spectrophotometric colorimeter CM-1000 (product of Minolta Co., Ltd.).

Example 3

A coating composition, for use in the formation of the resin layer having at its surface microscopic projections and depressions, was prepared from the following formulation.

| Ingredients | Parts by weight | Solids content[1] |
| --- | --- | --- |
| thermosetting acrylic resin B[7] | 60.0 | 60 |
| trimellitic anhydride | 15.0 | 15 |
| crosslinked resin particles[8] | 125.0 | 25 |
| PMAC[6] | 800.0 | |
| Total | 1000.0 | 100 |

[7]GMA/ST/MMA copolymer having a number-average molecular weight of 7,500
[8]In the form of 20%, by weight, solids in xylene, as prepared in the above-described preparation example The above-prepared coating composition and a coating composition containing the solid sol of silver, as prepared in Synthesis Example 1, were sequentially spin coated onto a glass plate by a wet-on-wet technique.

The composite coating was then heated at 160° C. for 1 minute, and oven calcined at 250° C. for 2 hours to form a thin metal film overlying a resin layer. The thin film showed a surface profile that substantially conforms in shape to microscopic projections and depressions provided on a surface of the underlying resin layer. A total thickness of the thin metal film and resin layer was 3.0 μm. A spectral reflectance of the thin metal film was 80%, when measured by a spectrophotometric calorimeter CM-1000 (product of Minolta Co., Ltd.).

Synthesis Example 2

Preparation of a Solid Sol of Gold

Poured into a beaker was 10 ml of a 1,000 mM aqueous solution of chloroauric acid which was subsequently diluted with 90 ml of acetone. 1 g of a polymeric dispersant, SOLSPERSE #24000 (name used in trade and manufactured by Zeneka Co., Ltd.; softening point=60° C.), was dissolved into the beaker content. After the polymeric dispersant was completely dissolved thereinto, 5 ml of dimethylethanol amine was added to obtain a colloidal solution of gold, as colored in bright deep red.

The obtained colloidal solution of gold was heated under a reduced pressure to remove acetone. Since the polymeric dispersant used, SOLSPERSE #24000 (name used in trade and manufactured by Zeneka Co., Ltd.; softening point=60° C.), was water-insoluble, the reduction in amount of acetone resulted in the increased deposition and precipitation of colloidal gold protected by the polymeric dispersant. A supernatant water phase was removed by decantation. The precipitate was washed with an ion-exchange water, and then dried thoroughly to obtain a solid sol of gold.

Example 4

Propylene glycol monomethyl ether acetate was added to the solid sol of gold, as prepared in Synthesis Example 2, to prepare a 15 wt. % colloidal solution. The colloidal solution obtained was spin coated onto a glass plate, oven dried at 160° C. for 10 minutes to remove the solvent, and oven calcined at 250° C. for 1 hour. As a result, a gold thin film was formed having a metallic luster. Its thickness was 0.5 μm and its surface resistivity was 0.2 Ω/□, when measured with ROLESTER (manufactured by Mitsubishi Yuka Co., Ltd.).

Synthesis Example 3

Preparation of a Solid Sol of Copper

Poured into a beaker was 10 ml of a 100 mM aqueous solution of copper (II) chloride which was subsequently diluted with 90 ml of acetone. 1 g of a polymeric dispersant, SOLSPERSE #28000 (name used in trade and manufactured by Zeneka Co., Ltd.; softening point <0° C), was dissolved into the beaker content. After the polymeric dispersant was completely dissolved thereinto, 10 ml of a 2 M aqueous solution of sodium boron hydride was added to obtain a colloidal solution of copper, as colored in bright deep red.

The obtained colloidal solution of copper was heated under a reduced pressure to remove acetone. Since the polymeric dispersant used, SOLSPERSE #28000 (name used in trade and manufactured by Zeneka Co., Ltd.; softening point <0° C.), was water-insoluble, the reduction in amount of acetone resulted in the increased deposition and precipitation of colloidal copper protected by the polymeric dispersant. A supernatant water phase was removed by decantation. The precipitate was washed with an ion-exchange water, and then dried thoroughly to obtain a solid sol of copper.

Exampel 5

Propylene glycol monomethyl ether acetate was added to the solid sol of copper, as prepared in Synthesis Example 3, to prepare a 20 wt. % colloidal solution. The colloidal solution obtained was spin coated onto a glass plate, oven dried at 160° C. for 10 minutes to remove the solvent, and oven calcined at 250° C. for 1 hour. As a result, a copper thin film was formed having a metallic luster. Its thickness was 1.0 μm and its surface resistivity was 0.3 Ω/□, when measured with ROLESTER (manufactured by Mitsubishi Yuka Co., Ltd.).

In accordance with the method of the present invention for forming a thin metal film, thin metal films can be formed in a cost-effective manner and by a simple process of applying a coating composition. Therefore, the method can be utilized for a wide range of uses, including formation of conductive circuit elements, such as electrodes and wiring, on semiconductor or printing substrates, and provision of metallic luster onto article surfaces for decorative purposes.

In accordance with the method of the present invention for fabrication of a reflector for reflective LCD devices, reflecting layers, in the form of thin metal films, can be fabricated in a cost-effective manner and by a simple process of applying a coating composition.

What is claimed is:

1. A method for forming a thin metal film comprising the steps of:

applying a coating composition containing colloidal particles of noble metal or copper prepared by reducing a compound of the noble metal or copper in the presence of a polymeric dispersant, to form a coating film; and heating said coating film so that said colloidal particles present therein are fused together to form a thin metal film having electrical conductivity and a metallic luster.

2. The method of claim 1, wherein said thin metal film is utilized to constitute an electrode or wiring.

3. The method of claim 1, wherein said thin metal film is utilized to impart a metallic luster, as if by plating, to an article surface.

4. The method of claim 1, wherein said thin metal film is utilized to impart an electromagnetic wave shielding property.

5. A method of fabricating a reflector, for use in reflective liquid crystal display devices which display images by reflecting at a surface of said reflector the light that has passed through a liquid crystal layer, the method comprising the steps of:

applying a coating composition containing colloidal particles of noble metal or copper prepared by reducing a compound of the noble metal or copper in the presence of a polymeric dispersant, to form a coating film; and heating said coating film so that said colloidal particles present therein are fused together to form a reflecting layer in the form of a thin metal film having electrical conductivity and a metallic luster.

6. The method of claim 5, wherein said coating film is applied onto a rough surface having microscopic projections and depressions, and said reflecting layer is constructed from the thin metal film having microscopic projections and depressions at its surface.

7. The method of claim 5, wherein a light-scattering layer is further provided to overlie the reflecting layer.

8. The method of claim 7, wherein said light-scattering layer comprises a clear coating film containing light-scattering fine particles.

9. A reflective liquid crystal display device incorporating the reflector fabricated by the method of claim 5.

10. The device of claim 9 further comprising a color filter layer provided on a reflective side of said reflector.

11. The device of claim 10, wherein said color filter layer is electrodeposited using said thin metal film as an electrode.

12. A method of fabricating a reflector, for use in reflective liquid crystal display devices which display images by reflecting at a surface of said reflector the light that has passed through a liquid crystal layer, the method comprising the steps of:

applying a coating composition containing colloidal particles of a noble metal or copper, prepared by reducing a compound of the noble metal or copper in the presence of a polymeric dispersant, to form a coating film; and heating said coating film so that said colloidal particles present therein are fused together to form a reflecting layer in the form of a thin metal film having electrical conductivity and a metallic luster;

wherein said coating composition further contains light-scattering particles, and said reflecting layer is constructed from the thin metal film containing the light-scattering particles.

13. The method of claim 12, wherein said coating film is applied onto a rough surface having microscopic projections and depressions, and said reflecting layer is constructed from the thin metal film having microscopic projections and depressions at its surface.

14. The method of claim 12, wherein a further light-scattering layer is provided to overlie the reflecting layer.

15. The method of claim 14, wherein said further light-scattering layer comprises a clear coating film containing light-scattering fine particles.

* * * * *